United States Patent
Geiger et al.

[15] 3,684,791

[45] Aug. 15, 1972

[54] $N^{\alpha(A1)}, N^{\epsilon(B29)}$-DI-TERT. BUTYLOXYCARBONYL-INSULIN AND PROCESS FOR ITS MANUFACTURE

[72] Inventors: Rolf Geiger, Frankfurt am Main; Werner Pfaff, Hofheim, Taunus; Alfred Bänder, Eppenhain, Taunus; Hans-Hermann Schöne, Bad Soden, Taunus; Adolf Mager, Niedernhausen, Taunus, all of Germany

[73] Assignee: Farbwerke Hoechst Aktiengesellschaft vormals Meister Lucius & Bruning, Frankfurt am Main, Germany

[22] Filed: Sept. 22, 1969

[21] Appl. No.: 859,688

[30] Foreign Application Priority Data

Sept. 28, 1968 Germany..........P 17 93 517.0

[52] U.S. Cl.................................260/112.7, 424/178
[51] Int. Cl........................A61k 17/02, C07c 103/52
[58] Field of Search....................260/112.7; 424/178

[56] References Cited

UNITED STATES PATENTS 3,528,960   9/1970   Haas......................260/112.7

OTHER PUBLICATIONS

Levy et al., Biochemistry (Wash.) 6, 3559– 3568 (1967).
Evans et al., J. Biol. Chem. 228, 295– 304 (1957).
Gaunt et al., Biochem. J. 33, 908, 909 and 911– 918 (1939).
Hunter et al., J. Am. Chem. Soc. 84, 3491– 3504 (1962).

*Primary Examiner*—Lewis Gotts
*Assistant Examiner*—Melvyn M. Kassenoff
*Attorney*—Curtis, Morris & Safford

[57] ABSTRACT

$N^{(A1)}, N^{(B29)}$-di-tert. butyloxycarbonyl insulin, useful as a hypoglycemic agent. A method for its preparation by reacting insulin, in a mixture of an N,N'-dialkylcarboxylic acid amide having a total of from three to six carbon atoms and an aqueous buffer solution having a pH between 8.0 and 9.0, with a 20 to 75 fold molar excess of tert. butyloxycarbonyl azide at 20° to 50°C.

2 Claims, 1 Drawing Figure

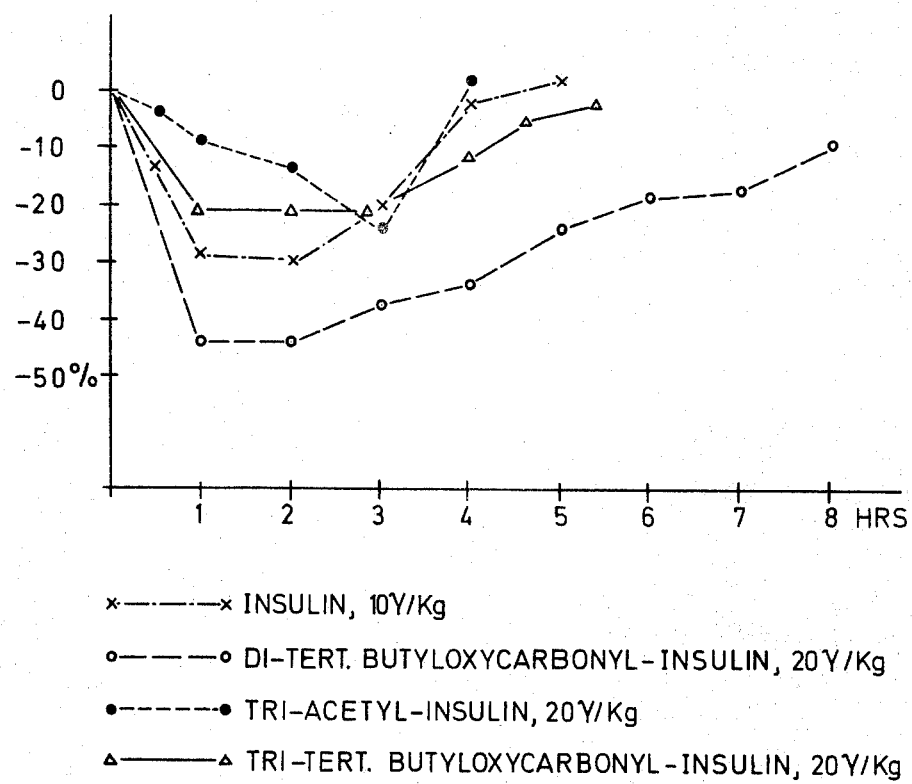
×—·—× INSULIN, 10 Y/Kg
○———○ DI-TERT. BUTYLOXYCARBONYL-INSULIN, 20 Y/Kg
●-----● TRI-ACETYL-INSULIN, 20 Y/Kg
△————△ TRI-TERT. BUTYLOXYCARBONYL-INSULIN, 20 Y/Kg
INVENTORS
ROLF GEIGER
WERNER PFAFF
ALFRED BÄNDER
HANS-HERMANN SCHÖNE
ADOLF MAGER
BY *Curtis, Morris & Safford*
ATTORNEYS

$N^{\alpha(A1)}$, $N^{\epsilon(B29)}$-DI-TERT. BUTYLOXYCARBONYL-INSULIN AND PROCESS FOR ITS MANUFACTURE The present invention relates to $N^{\alpha(A1)}$, $N^{\epsilon(B29)}$-di-tert. butyloxycarbonyl-insulin and to a process for preparing the same. Said compound, whose insulin activity shows a marked depot effect, is obtained by reacting insulin with a 20–75 fold molar excess of tert. butyloxycarbonyl-azide at 20° to 50°C in a mixture consisting of an N,N'-dialkyl-carboxylic acid amide having in total from three to six carbon atoms and an aqueous buffer solution whose pH ranges from 8.0 to 9.0.

The blocking of insulin amino groups by acylation has frequently been attempted. Thus in Biochimica et Biophysica Acta, 5, 89–97(1950), pages 89–97) the influence of such reactions upon the biological action has been examined. In Compt. rend. Lab. Carlsberg, Ser. chim. 30, 104–125(1956), insulin phenyl carbamoyl derivatives are described; however, even under controlled conditions the partial reaction of insulin with phenylisocyanate always yields, always mixtures, for example, a mixture of unreacted insulin, mono- and diphenyl-carbamoyl insulin.

Under more severe conditions, more uniform triacyl derivatives may be obtained. However, these possess less favorable properties in regard to the biological action. Thus, for example, triacetyl-insulin and tri-tert. butyloxycarbonyl-insulin which are disclosed in Biochemistry, 6, 3559–3568(1967) show only 25–30 percent of the biological action of insulin in the spasm test on mice.

It has now been found that $N^{\alpha(A1)}$, $N^{\epsilon(B29)}$-di-tert. butyl-oxycarbonyl insulin exhibits still about 60 percent of the insulin activity in the spasm test on mice and that, after a comparatively rapid rise of action, it displays a pronounced depot effect.

The results of the characteristic tests are compiled in the accompanying diagram wherein the percentage of lowering of the blood-sugar level in dogs after subcutaneous injection has been plotted against time.

It is surprising and a special advantage of the present process that, contrary to that of all partially acylated insulin derivatives hitherto known, the manufacture of the new compound may be conducted so as to form almost exclusively the di-tert. butyloxycarbonyl insulin. The two tert. butyloxycarbonyl groups are attached to the $N^\alpha$-amino group of the A1-glycine and the N-$\epsilon$-amino group of the B29-lysine whereas the B1-phenylalanine amino group remains unaltered. This is borne out by the fact that after reacting di-tert. butyloxycarbonyl-insulin with 2,4-di-nitrofluorobenzene and subsequent complete hydrolysis of the reaction product, the amino acid analysis shows that only one equivalent of phenylalanine is missing, i.e. has been converted into the N-dinitrophenyl compound, whereas the theoretical values are found for glycine and lysine. Hence it follows that the amino groups of both the amino acids mentioned were protected by the tert. butyloxycarbonyl radicals.

This substitution is surprising, as it is known from investigations into the acylation of insulin with, for example, isocyanates that the phenylalanine amino group reacts first and only then the amino group of glycine [cf. Hoppe Seyler's Z. Physiol. Chem. 350 741–750(1969)].

As the starting substance, insulin of various species may be used. Preferred are bovine or porcine insulin or mixtures of these two insulins in an optional mixing ratio.

The process of the invention is, for example, carried out in the following manner: One millimol of insulin is suspended or dissolved in 30–70 times the amount by weight of a N-N'-dialkyl-carboxylic acid amide, for example dimethylformamide, dimethylacetamide, diethylformamide or N-methyl-pyrrolidone. Subsequently, 20 to 75 millimols of tert. butyloxycarbonylazide and an amount of buffer solution which is 2.5–4 times the amount by weight of the insulin are added and the mixture is stirred for 6 hours at about 40°C. As the buffer solution, 1N sodium bicarbonate or potassium bicarbonate or alkali metal phosphate-buffer may serve. The reaction temperature may also be raised up to 50°C. However, 40°C is preferred. Room temperature may also be used. However, in this case four to six times the period is required for the reaction.

For recovery of the product, the solution is evaporated to dryness in vacuo at a temperature not exceeding 50°C. After trituration with ether and digestion with a 5–50 fold the amount by weight of 1–2 percent aqueous acetic acid, $N^{\alpha(A1)}$, $N^{\epsilon(B29)}$-di-tert. butyloxycarbonyl-insulin is obtained in a yield of 85–95 percent, said compound being free from insulin and containing no more than a total of 5 percent of mono- and tri-tert. butyloxycarbonyl-insulin. The compound is slightly soluble in dilute acetic acid but is soluble in water having a pH of about 6 or more.

The $N^{\alpha(A1)}$, $N^{\epsilon(B29)}$-di-tert. butyloxycarbonyl-insulin possesses the blood-sugar lowering properties mentioned and therefore is useful for the treatment of diabetes mellitus. When, administered subcutaneously, it shows a depot effect. However, its action differs in kind from that of insulin and conventional depot insulin preparations. For instance, it was found, surprisingly, that the $N^{\alpha(A1)}$, $N^{\epsilon(B29)}$ di-tert. butyloxycarbonyl-insulin has a protracted action also after intravenous injection. This advantage is the more surprising since, for example, chemically closely related compounds such as dibenzyloxycarbonyl-insulin have little biological activity and no prolonged effect. The new compound is employed, primarily, in injection solutions, for which the usual pharmaceutically tolerable solvents are used, for example water or physiological salt solution, optionally together with appropriate stabilizers and/or carriers. As a single dose for injection solutions, 0.5–5 mg per ml may be used.

The following examples serve to illustrate the invention. The acylated insulins have been identified by paper electrophoresis (for 4 hours at 200 volt) in formic acid of 20 percent strength; for coloring bromthymol blue was used.)

EXAMPLE 1

1 g (0.167 mmol) of porcine insulin was dissolved in 70 cc of dimethylacetamide. 1.45 g (10 mmols) of tert. butyloxycarbonyl-azide and 3.3 cc (3.3 mmols) of sodium bicarbonate were added thereto. The solution was stirred for 6 hours at 40°C, concentrated in vacuo at no more than 50°C and the residue was triturated with ether. 1.275 g of a salt-containing raw product was obtained which after digestion with 20 cc of 2 percent aqueous acetic acid yielded 945 mg of $N^{\alpha(A1)}$, $N^{\epsilon(B29)}$-di-tert. butyloxycarbonylInsulin (porcine).

EXAMPLE 2

1 g of bovine insulin was reacted with 0.72 g (5 mmols) of tertiary butyloxycarbonylazide according to example 1. 901 mg of $N^{\alpha(A1)}$, $N^{\epsilon(B29)}$-di-tert. butyloxycarbonyl-insulin (bovine) were obtained.

EXAMPLE 3

1 g of a mixed insulin (bovine and porcine) of any mixing ratio was reacted with 0.54 g (3.5 mmols) of tert. butyloxycarbonylazide according to example 1. The reaction yielded 898 mg of $N^{\alpha(A1)}$, $N^{\epsilon(B29)}$-di-tert. butyloxycarbonyl-insulin.

EXAMPLE 4

10 mg of synthetic human insulin were reacted according to example 1. The yield amounted to 8.5 mg of $N^{\alpha(A1)}$, $N^{\epsilon(B29)}$-di-tert. butyloxycarbonyl-insulin (human).

EXAMPLE 5

1 g (0.167 mmols) of mixed insulin in 30 cc of dimethylformamide of 80 percent strength, to which 2.5 cc (2.5 mmols) of potassium bicarbonate were added, was stirred at 30°C. for 15 hours with 1.2 g (8.4 mmols) of tert. butyloxycarbonyl azide. Recovery of the product was effected as in example 1. The yield amounted to 878 mg of $N^{\alpha(A1)}$, $N^{\epsilon(B29)}$-di-tert. butyloxycarbonyl insulin.

EXAMPLE 6

1 g (0.167 mmols) of mixed insulin was stirred in 70 cc of N-methyl-pyrrolidone of 80 percent strength for 4 hours at 45°C. with 4 cc of borate buffer of a pH ranging from 8.2 to 8.5 and 1.8 g (12.6 mmols) of tert. butyloxycarbonyl azide. Recovery of the product was effected as in example 1. The yield amounted to 890 mg of $N^{\alpha(A1)}$, $N^{\epsilon(B29)}$-di-tert. butyloxycarbonyl insulin.

We claim:
1. $N^{\alpha(A1)}$, $N^{\epsilon(B29)}$-di-tert. butyloxycarbonyl-insulin.
2. A process for preparing $N^{\alpha(A1)}$, $N^{\epsilon(B29)}$-di-tert.-butyloxycarbonyl-insulin which comprises reacting insulin with a 20- to 75-fold molar excess of tert.-butyloxycarbonyl azide at 20°–50°C. in a mixture of an N,N-dialkyl alkanoic acid amide having from three to six carbon atoms and an aqueous buffer solution having a pH between 8.0 and 9.0 the amount of buffer being at least 2.5 times the amount of insulin, by weight.

* * * * *